N. HEID.
MACHINE FOR THE MANUFACTURE OF TUBES FROM METAL STRIPS.
APPLICATION FILED AUG. 9, 1906.
915,673.
Patented Mar. 16, 1909.
3 SHEETS—SHEET 1.
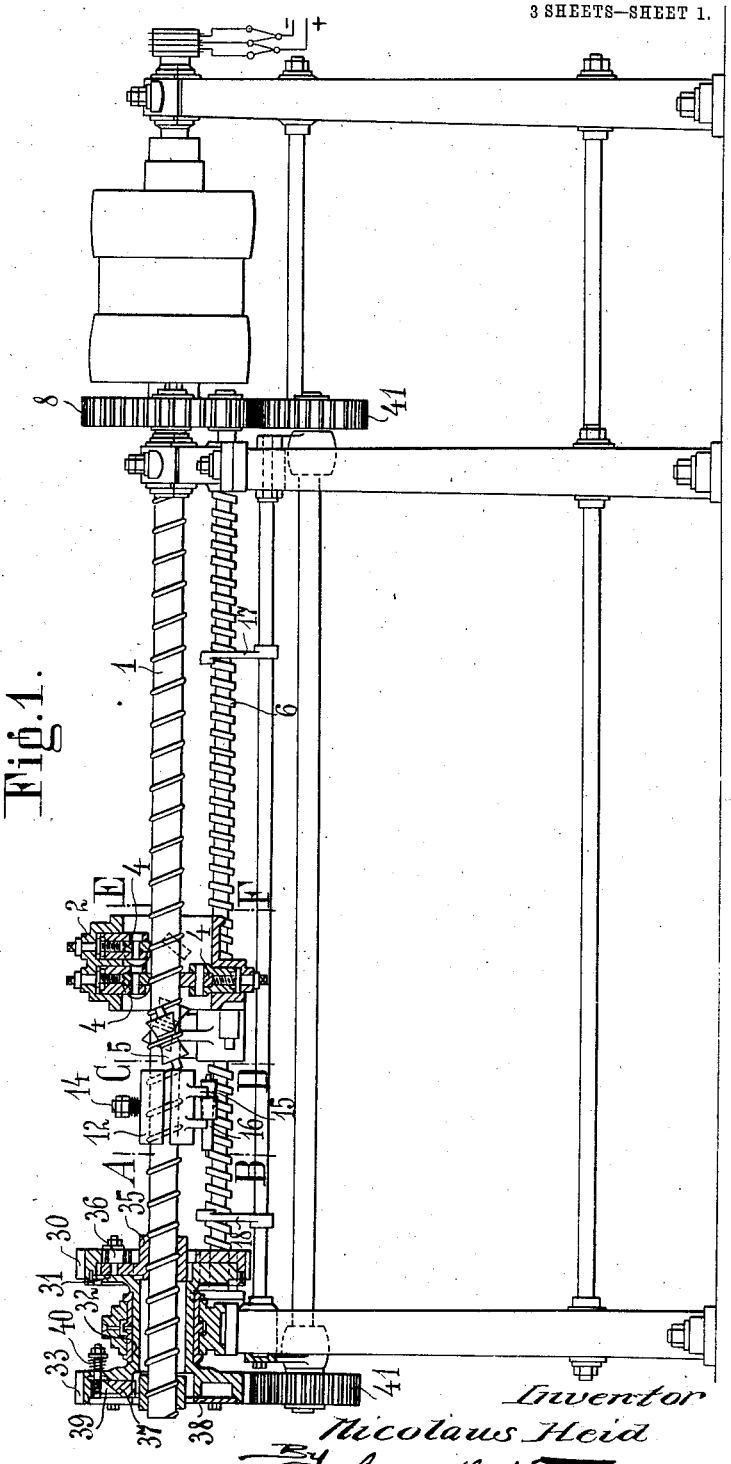
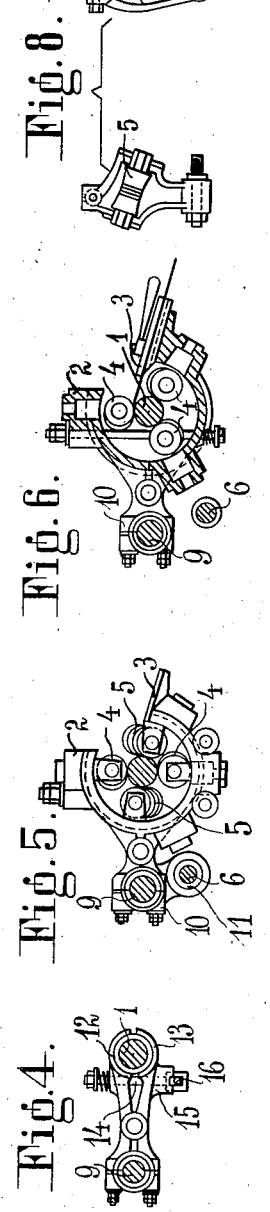

N. HEID.
MACHINE FOR THE MANUFACTURE OF TUBES FROM METAL STRIPS.
APPLICATION FILED AUG. 9, 1906.
915,673.
Patented Mar. 16, 1909.
3 SHEETS—SHEET 3.
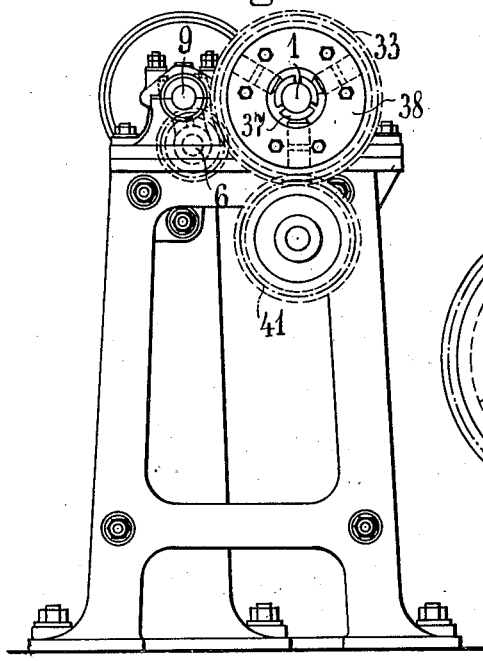
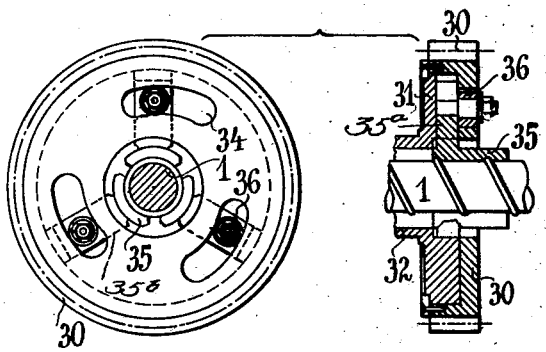
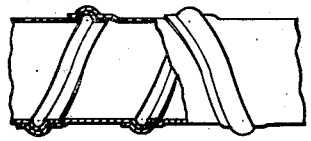
Witnesses:
Inventor
Nicolaus Heid
By
James L. Norris
Atty.

UNITED STATES PATENT OFFICE.

NICOLAUS HEID, OF STOCKERAU, NEAR VIENNA, AUSTRIA-HUNGARY.

MACHINE FOR THE MANUFACTURE OF TUBES FROM METAL STRIPS.

No. 915,673.     Specification of Letters Patent.     Patented March 16, 1909.

Application filed August 9, 1906. Serial No. 329,900.

*To all whom it may concern:*

Be it known that I, NICOLAUS HEID, subject of the Emperor of Austria-Hungary, residing at Stockerau, near Vienna, Austria-Hungary, have invented certain new and useful Improvements in Machines for the Manufacture of Tubes from Metal Strips, of which the following is a specification.

This invention relates to improvements in machines for the manufacture of tubes from spirally wound metal strips, in which the metal strip is as is well-known, wound on a rotary spindle which is either plain or is provided with a sunk or raised screw-thread, according to whether the joints or seams in the manufactured tube are to be plain or creased and on which a screw stock carriage is adapted to slide. In the arrangement known hitherto the carriage is either formed as a nut or carries rollers which press the metal strip that is led to the spindle at an acute angle, against the spindle and thereby causes the strip to be spirally wound on the spindle. The use of such a sliding nut carriage or screw-stock may enable the strips at the seams to be brought firmly into engagement or contact with each other, by equalizing the compressive strains, but the great amount of friction resulting from its use necessitates a large amount of power to drive the machine, moreover the working surfaces thereof wear out in a very short time after which the machine works imperfectly. In addition to these disadvantages the material of the strips is subjected to very undesirable treatment for, as the sliding nut acts similarly to a draw-plate, the result is that the material is made less ductile or hardened and the finished tube does not present the same good quality of material that existed in the strips at the start. On the other hand pressure rollers have a disadvantage in that their use frequently results in unequal compressive strains between the strip edge portions at the seams and consequent loosening thereof.

The present invention has for object to provide a machine in which the disadvantages of both these types of existing machine are obviated. For this purpose in the improved machine a carriage, adapted to slide on the spindle, carries in addition to the main pressure rollers, other pressure rollers which are mounted behind the main pressure rollers, are arranged like the main pressure rollers, with their axes perpendicular to the tube seam and which are hyperboloidal in form so that they are adapted to fit close to the already formed tube and tend to thoroughly equalize the compressive strains and level the irregularities arising from the winding-on process, an extremely strong tube being thereby obtained. With the pressure roller and following roller carriage or carrier there may be combined a clamping device for holding the finished tube while it is being pushed off the spindle. The driving mechanism may be fitted with a centering device for the spindle and be arranged so as to reverse automatically.

Figure 1 of the accompanying drawings represents partly in side elevation and partly in section one construction of machine according to this invention. Fig. 2 shows the machine in plan and Fig. 3 in end elevation. Figs. 4, 5 and 6 are transverse sections corresponding to the lines A—B C—D and E—F respectively of Fig. 1. Fig. 7 shows the driving disk of the driving mechanism in end elevation and central vertical section respectively and Fig. 8 illustrates the bearings of the equalizing rolls. Figs. 9, 10 and 11 illustrate an alternative form of clamping device and Figs. 12 and 13 show two pieces of completed tube, one of which is formed with a raised crease and the other with a sunk crease.

On the spindle 1, which is formed with a screw-thread corresponding to the seam crease to be formed in the metal strip is arranged to slide a carriage 2 which is loosely mounted on a driving shaft 9, is provided with a device 3 for the introduction of the metal strip and carries the several main pressing rollers 4 and the follower or strain-equalizing rollers 5. The rollers 5 rest in bearings adapted to be secured to the carriage 2 by bolts about which they can turn and which are drawn toward one another in an elastic manner as by springs, as shown. The guide 3 through which the metal strip to be wound on the spindle 1 is fed in the direction of the spindle screw-thread, is fitted with a check clamp adapted to produce the necessary tension in the strip. The pressure rollers 4, the upper ones of which form creasing rollers and the lower ones carrying rollers and the following or strain-equalizing rollers 5 arranged behind them are mounted with their axes perpendicular to the screw-thread of the spindle and are of hyperboloidal form so that they adapt themselves to the periphery of the spindle. The arrangement is therefore such that when a plain metal strip is fed through the guide 3 toward the spindle 1 in the direction of the screw-thread thereon, the creasing rollers 4 grip the strip and draw it into the machine by the resulting pressure upon it between the roller and the spindle, the crease being thereby simultaneously formed and as the strip is wound on the spindle the rearward crease arrives under the forward crease and both creases are firmly connected and pressed together.

As the work proceeds the metal strip is forced down onto the spindle between the creases by the rear carrying roller 4 so that the internally projecting edge portions of the creased strip are pressed down. The tube so formed then passes between the two rollers 5 which are located opposite each other, embrace the tube for a length thereof equal to nearly twice the pitch of the screw thread and which perform the last operation viz., that of equalizing or neutralizing the compressive strains arising in the wound metal strip from the several foregoing operations. This last operation is very important in regard to the perfect finishing of the tube.

The continued winding of the metal strip on the spindle 1 involves a corresponding movement of the carriage 2 and this movement is effected by means of a screw spindle 6 which is driven by a gear wheel 7 through a gear wheel 8 that is mounted on the spindle 1. The pitch of the screw-thread on the spindle 6 is such as to neutralize the transmission ratio of the gear-wheels 7 and 8 that is to say to make the gear 7—8 equal to a one to one gear.

The carriage 2 is guided on the driving shaft 9 by a sleeve 10 which is provided with a nut 11 arranged to work on the spindle 6 so as to be moved forward upon rotation of the same. A clamping device is connected to the carriage 2 by the sleeve 10 which serves to hold the tube while it is being withdrawn from the spindle 1, and consists, in the construction shown in Figs. 1, 2 and 4 of two clamping jaws 12, 13 pivotally connected to each other and embracing the spindle 1 after the fashion of claws and which are held together by a pin 14 on which is arranged a spring that constantly tends to lift the pin 14. The lower jaw 13 is formed with two lugs 15 between which and the head of the pin 14 is arranged to slide a cotter 16. This cotter is wedge-shaped and is arranged in the path of fixed stops 17 and 18 located near the ends of the machine. When the cotter strikes against the stop 17 the pin 14 is drawn downwardly thus closing the clamping device while when the cotter 16 strikes against the stop 18 the reverse action takes place and the clamping device is opened.

In the modified construction of clamping device shown in Figs. 9, 10 and 11 the sleeve 10 is mounted to rotate in the carriage 2 and is provided at each end with a friction cone 19 and 20, while on each end of the driving shaft 9 is mounted, in a manner admitting of longitudinal displacement, a spring pressed hollow cone 21 and 22 with which the cones 19 and 20 are adapted to engage. Fixed on the sleeve 10 is a toothed wheel 23 gearing into a toothed part of a disk 24 which is formed with eccentric or cam slots 25. 27, 27 are clamping jaws adapted to grip the spindle 1 and which are mounted to move radially in suitable guides of a casing 26. These jaws carry rollers 28 that work in the cam slots 25, the arrangement being such that upon the disk 24 being rotated the clamping jaws 27 are caused to move radially in their guides toward or away from the shaft 1. When the carriage 2 is moved to the right the cone 19 is forced into the hollow cone 21 and moves it longitudinally and reverses the direction of rotation of the driving shaft 9. The hollow cone 21 then frictionally drives the sleeve 10 through the cone 19 and the gear wheel 23 on the latter partially rotates the disk 24, thereby closing the clamping jaws 27 through the cam slots 25 and rollers 28. When the sleeve 10, by movement of the carrier 2 to the left, is brought against the hollow cone 22, a similar operation is effected but in this case the clamping jaws are opened. In this construction of clamping device the clamping jaws are operated when the spindle 1 is practically at rest, that is to say, during the time in which the driving gear is taking up its loose motion while moving into action for reversing rotation of the spindle.

The spindle 1 is driven by the shaft 9 and when the machine is fitted with clamping devices such as shown in Figs. 1, 2 and 4, is automatically reversed longitudinally of the carriage 2; and which when the machine is fitted with a clamping device such as shown in Figs. 9, 10 and 11, is reversed by the hollow cones 21 and 22 as before described. On the shaft 9 is fixed a toothed wheel 29 which gears into a toothed ring 30 mounted on a disk 31 formed in one with a sleeve 32. The sleeve 32 which forms a hollow journal is provided with a disk at each end and the second disk 33 is also formed with gear teeth on its periphery. The disk-like wall of the toothed ring 30 is formed with eccentric or cam slots 34 and between this wall and the disk 31 are arranged jaws 35 having shanks 35$^a$, suitably guided to move radially in guide-ways 35$^b$. Rollers 36 in the cam slots 34 and carried by the shanks 35$^a$ move these jaws radially toward or away from the spindle as the disk-like wall of the toothed ring is rotated in one direction or the other.

Within the toothed rim of the disk 33 are guided radially sliding dies 37 that are held in place by a covering disk 38. Bearing on the outer end faces of the dies 37 are wedge pieces 39 the inclined faces of which are pressed by springs 40 against the correspondingly inclined faces of the dies 37 so that the dies are pressed inwardly on to the spindle 1 which is thereby effectively held in its central position without retarding the movement of the tube out of the machine. The toothed wheel 33 is connected through a countershaft and gearing 41 with the toothed wheel 8 fixed on the spindle 1 the carriage 2 or carriage sleeve 10 on which effects the reversal of the machine as hereinbefore described.

The operation of the improved machine is as follows: On work being started the carriage 2 is located near the stop 18, in which position the clamping device, Fig. 4, is open. The metal strip is then introduced between the spindle 1 and the two upper pressure rollers 4, the strip guide 3 is closed and the machine is started. The wheel 29 on the shaft 9 thereupon rotates the toothed ring 30 the cam slots 34 of which push the dies 35 inwardly until they bear tight on the spindle 1 or rather on a tube that is on the spindle. Through the friction resistance so produced the sleeve 32 together with the centering disk 33, is caused to rotate and this rotation is transmitted through the countershaft and gearing 41 to the spindle 1. If the machine is fitted with a clamping device such as shown in Figs. 9, 10 and 11 such device is operated to open it during the period of time in which the driving action is being transmitted to the spindle 1. The metal strip is then wound spirally on the spindle 1 as a tube, the pressure rollers 4 and the following or strain-equalizing rollers 5 acting thereon and producing the effect already described the carriage 2 being simultaneously moved toward the electric clutch. On the carriage reaching its extreme position in one direction the clamping device Fig. 4 is closed by the stop 17 as hereinbefore described or, if the machine is fitted with the alternative construction of clamping device, the sleeve 10 of the carriage is clutched to the shaft 9 and the electric clutch is reversed. The toothed ring 30 is then again driven, but in the reverse direction, the dies 35 being moved by the slots 34 outward, then the sleeve 32 and consequently the spindle 1 are again rotated. During this interval the clamping device, Figs. 9 to 11, if fitted to the machine, is shut. The clamping device then firmly holds the finished tube against rotation and the screw-thread on the rotating spindle 1 pushes the tube off from the spindle. At this time the tube passes freely between the open dies of the driving disk 31 and the springs 40 of the dies 37 of the centering disk 33 allow these dies to yield sufficiently for the tube to pass. On the carriage 2 again reaching its starting position the machine is again reversed, the clamping device is opened and the winding-on process is repeated.

What I claim is:—

1. A machine for manufacturing tubes from spirally wound strips comprising a rotary spindle, a carriage mounted to slide upon said spindle, a set of pressure rollers of hyperboloidal form mounted upon the carriage and extending perpendicularly to the inclination of the tube seam, and another set of pressure rollers positioned at a distance from and duplicates in contour and extending in a like manner as the first mentioned set of pressure rollers and adapted to equalize the compressive strains and to level any irregularities existing in the formed tube.

2. A machine for manufacturing tubes from spirally wound strips comprising a rotary spindle, a carriage mounted to slide upon said spindle, a set of pressure rollers of hyperboloidal form mounted upon the carriage and extending perpendicularly to the inclination of the tube seam, another set of pressure rollers positioned at a distance from and duplicates in contour and extending in a like manner as the first mentioned set of pressure rollers and adapted to equalize the compressive strains and to level any irregularities existing in the formed tube, a clamping device traveling with the carriage and adapted to firmly hold the tube formed on the spindle, means for automatically opening the clamping device on the initial starting of the carriage, and means for automatically closing the clamping device when the carriage arrives at the limit of movement in one direction.

3. A machine for manufacturing tubes from spirally wound strips comprising a rotary spindle, a carriage mounted to slide upon said spindle, a set of pressure rollers of hyperboloidal form mounted upon the carriage and extending perpendicularly to the inclination of the tube seam, another set of pressure rollers positioned at a distance from and duplicates in contour and extending in a like manner as the first mentioned set of pressure rollers and adapted to equalize the compressive strains and to level any irregularities existing in the formed tube, a pair of pivoted clamping jaws embracing the spindle and traveling with the carriage and adapted to firmly hold the tube formed on the spindle, said lower jaw provided with lugs, a pin carrying a spiral spring adapted to hold said jaws together, a wedge-shaped cotter mounted to slide between said lugs and the head of said pin, and stops located at the two extreme positions of the carriage in the path of the cotter, one of said pins adapted to engage the cotter, thereby opening the jaws and the other pin adapted to engage the cotter, thereby closing the jaws.

4. A machine for manufacturing tubes from spirally wound strips comprising a rotary spindle, a carriage mounted to slide upon said spindle, a set of pressure rollers of hyberboloidal form mounted upon the carriage and extending perpendicularly to the inclination of the tube seam, another set of pressure rollers positioned at a distance from and duplicate in contour and extending in a like manner as the first mentioned set of pressure rollers and adapted to equalize the compressive strains and to level any irregularities existing in the formed tube, a hollow journal on said spindle near one end thereof carrying an inner and an outer toothed disk, a wheel mounted on the other end of the spindle, means for gearing said outer disk with said wheel, radially movable dies located within the rim of the outer disk and longitudinally braced inwardly toward the spindle, a machine driving shaft, a spur wheel fixed on said shaft and gearing with said inner disk, said inner disk provided with cam slots, radially movable dies within said inner disk, and means engaging in the cam slots and with said dies within the inner disk for pressing said dies toward the spindle when the strip is being wound thereon and for moving said dies from the spindle when the tube is being pushed off of the spindle.

5. A machine for manufacturing tubes from spirally wound strips comprising a rotary spindle, a carriage mounted to slide upon said spindle, a set of pressure rollers of hyperboloidal form mounted upon the carriage and extending perpendicularly to the inclination of the tube seam, another set of pressure rollers positioned at a distance from and duplicate in contour and extending in a like manner as the first mentioned set of pressure rollers and adapted to equalize the compressive strains and to level any irregularities existing in the formed tube, an independent screw-threaded spindle for imparting a sliding movement to the carriage, and means driven from the tube spindle for actuating said screw-threaded spindle.

6. A machine for manufacturing tubes from spirally wound strips comprising a set of main pressure rollers of hyperboloidal form acting upon the strip, and another set of pressure rollers of hyperboloidal form arranged at a distance from the first set and adapted to equalize the compressive strains and to level any irregularities existing in the formed tubes.

7. A machine for manufacturing tubes from spirally wound strips comprising a set of main pressure rollers of hyperboloidal form acting upon the strip, and another set of pressure rollers of hyperboloidal form arranged at a distance from the first set and adapted to equalize the compressive strains and to level any irregularities existing in the formed tube, each of the rollers of each of said sets of rollers extending perpendicularly to the inclination of the tube seam.

In testimony whereof I have hereunto set my hand in presence of two subscribing witnesses.

NICOLAUS HEID.

Witnesses:
JOSEF RUBARD,
ALVESTO S. HOGUE.